US009732618B2

(12) United States Patent
Roussely-Rousseau et al.

(10) Patent No.: US 9,732,618 B2
(45) Date of Patent: Aug. 15, 2017

(54) TURBINE WHEEL IN A TURBINE ENGINE

(71) Applicant: SNECMA, Paris (FR)

(72) Inventors: Amaury Roussely-Rousseau, Toulouse (FR); Son Le Hong, Thomery (FR); Jean-Pierre Mareix, Chartrettes (FR)

(73) Assignee: SNECMA, Paris (FR)

( * ) Notice: Subject to any disclaimer, the term of this patent is extended or adjusted under 35 U.S.C. 154(b) by 719 days.

(21) Appl. No.: 13/909,282

(22) Filed: Jun. 4, 2013

(65) Prior Publication Data
US 2013/0343894 A1  Dec. 26, 2013

(30) Foreign Application Priority Data

Jun. 4, 2012  (FR) ...................................... 12 55192

(51) Int. Cl.
*F01D 5/30* (2006.01)
*F01D 5/10* (2006.01)

(52) U.S. Cl.
CPC ................ *F01D 5/30* (2013.01); *F01D 5/10* (2013.01); *F01D 5/3007* (2013.01); *F01D 5/3092* (2013.01); *F05D 2250/75* (2013.01); *F05D 2300/6033* (2013.01); *Y02T 50/672* (2013.01)

(58) Field of Classification Search
CPC ........ F01D 5/30; F01D 5/3007; F01D 5/3015; F01D 5/3092; F01D 5/3023; F05D 2250/75
See application file for complete search history.

(56) References Cited

U.S. PATENT DOCUMENTS

| 2,669,383 | A | * | 2/1954 | Thompson | .............. F01D 5/141 |
| | | | | | 416/219 R |
| 3,266,771 | A | * | 8/1966 | Morley | ..................... F01D 5/22 |
| | | | | | 416/190 |
| 6,290,466 | B1 | | 9/2001 | Ravenhall et al. | |
| 6,315,298 | B1 | * | 11/2001 | Kildea | .................. F01D 11/006 |
| | | | | | 277/433 |

(Continued)

FOREIGN PATENT DOCUMENTS

| EP | 1 085 172 A2 | 3/2001 |
| EP | 2 014 873 A1 | 1/2009 |

OTHER PUBLICATIONS

U.S. Appl. No. 13/892,601, filed May 13, 2013, Illand, et al.
(Continued)

*Primary Examiner* — Gregory Anderson
*Assistant Examiner* — Michael Sehn
(74) *Attorney, Agent, or Firm* — Oblon, McClelland, Maier & Neustadt, L.L.P.

(57) ABSTRACT

A turbine wheel in a turbine engine is provided. The wheel includes a disk having a plurality of blades with roots that are axially engaged and radially retained in longitudinal slots in the outer periphery of the disk, the blades having platforms that extend circumferentially end to end and that are radially facing longitudinal teeth of the disk that define the slots. Protection members for protecting the flanks of the slots and made out of sheet metal are mounted on the teeth of the disk and held thereon by co-operating shapes, the protection members bear radially against the platforms of the blades in order to oppose circumferential tilting of the blades, and at least partially close the radial gaps between the teeth and the platforms of the blades.

14 Claims, 4 Drawing Sheets

(56) References Cited

U.S. PATENT DOCUMENTS

| | | | |
|---|---|---|---|
| 7,284,958 B2* | 10/2007 | Dundas | F01D 5/3007 416/193 A |
| 7,291,946 B2* | 11/2007 | Clouse | F01D 5/26 310/51 |
| 8,066,489 B2* | 11/2011 | Holmes | F01D 5/22 29/889.21 |
| 2003/0012654 A1* | 1/2003 | Strassberger | F01D 11/008 416/219 R |
| 2009/0022594 A1 | 1/2009 | Garner et al. | |
| 2009/0060745 A1 | 3/2009 | Douguet et al. | |
| 2010/0158686 A1 | 6/2010 | Kim et al. | |
| 2010/0209253 A1* | 8/2010 | Menheere | F01D 5/3092 416/219 R |
| 2011/0027098 A1* | 2/2011 | Noe | C04B 35/573 416/241 B |
| 2012/0121434 A1 | 5/2012 | Kim et al. | |
| 2012/0244003 A1* | 9/2012 | Mason | F01D 11/008 416/219 R |

OTHER PUBLICATIONS

French Preliminary Search Report and Written Opinion issued Jan. 25, 2013, in French 1255192, filed Jun. 4, 2012 (with English Translation of Categories of Cited Documents).

* cited by examiner

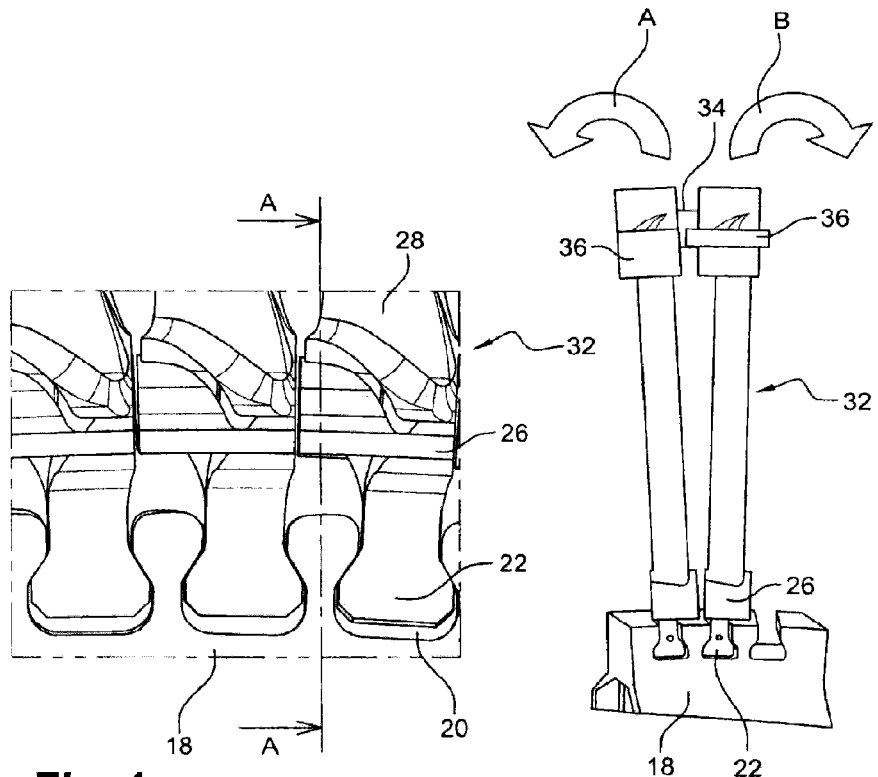
Fig. 4
Background Art
Fig. 5
Background Art
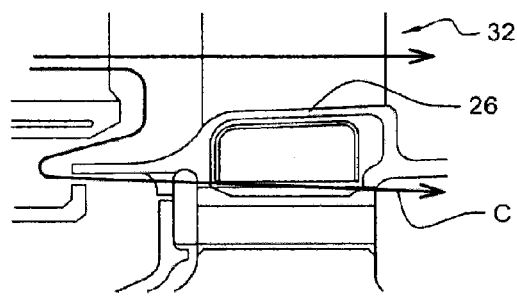
Fig. 6
Background Art

TURBINE WHEEL IN A TURBINE ENGINE

BACKGROUND OF THE INVENTION

Field of the Invention

The invention relates to a turbine wheel in a turbine engine, and also to a turbine engine including a turbine fitted with such a wheel.

Description of the Related Art

In the prior art, a turbine wheel comprises a disk including in its outer periphery a plurality of teeth that are regularly distributed around the axis of the wheel and that between them define slots for axially mounting and radially retaining blade roots.

Each blade root has a circumferentially-extending platform with an airfoil extending radially outwards from the platform. The blade platforms are arranged circumferentially end to end radially facing the teeth of the disk, and they form an inner wall defining the inner surface over which there flows a stream of hot gas leaving a combustion chamber arranged upstream from the turbine.

On either side of the blade roots there are formed circumferentially-projecting portions that are arranged immediately over the teeth of the disk. These projecting portions, also referred to as rims, serve in particular to limit the extent to which hot gas can be reinserted between the platforms and the teeth of the disk. These rims also serve to limit tilting movements of the blades in a circumferential direction by coming to bear against the teeth of the disk.

At their free radial ends, the blades present respective transverse elements or "outer platforms" that serve in particular to define the outside of the flow passage for the gas stream passing through the turbine.

The outer platform of a blade has an upstream edge and a downstream edge extending perpendicularly to the flow direction of the gas stream. These upstream and downstream edges are connected together via two side edges via which the outer platform of the blade makes contact with the outer platforms of two adjacent blades of the rotor wheel.

In general, with metal blades, these side edges have a so-called Z profile, i.e. each of them has two axial portions connected together by a portion that is substantially transverse. In order to damp the vibration to which they are subjected while the turbine is in operation, it is known to mount the blades on the disk so that they are subject to prestress in twisting about their main axes. At the outer platform of any given blade, this twist prestress gives rise to the transverse portions of the outer platform of the blade being put into contact with the transverse portions of the outer platforms of the adjacent blades. The contact and friction forces as generated in this way via the outer platforms of the blades serve to dissipate the vibratory energy that results from the turbine operating.

Such vibration damping is nevertheless not applicable to rotor wheels having blades that are made of composite material. In particular, for a blade made of ceramic matrix composite (CMC) material, the stresses generated by twisting the blade are too great compared with the capacities of the composite material.

In order to solve those problems, the Applicant has proposed in its application WO 2011/104457 to mount vibration dampers between the outer platforms of adjacent blades made of composite material in a rotor wheel.

That solution is particularly advantageous for blades made of composite material. Nevertheless, it is difficult if not impossible to make anti-tilting rims for such blades. Composite material blades are made by superposing a plurality of layers of material, and adding such rims would require adding additional layers of material that would then need to be machined, which is lengthy, expensive, and difficult to do with composite materials.

Thus, in the absence of rims, the blades are free to tilt about respective axes passing through their blade roots, and that can lead to separation of dampers mounted between the outer platforms of adjacent blades, so that the blades no longer present good mechanical behavior when faced with vibration. Furthermore, the absence of rims leads to a longitudinal cavity between the teeth and the radially facing platforms, thus allowing hot gas to recirculate over the teeth of the disk and greatly shortening the lifetime of the disk and of the entire rotor of which it forms a part.

In order to limit circumferential tilting of the blades, it is known to mount spacers between the blade roots and the bottoms of the slots, such spacers exerting an outwardly-directed radial force in order to press the blade roots against the flanks of the slots.

Nevertheless, such spacers are difficult to make because of the small gap that exists between the root of each blade and the bottom of the corresponding slot, which means that each spacer must be machined individually. Furthermore, such spacers can become deformed in operation, which means that they no longer guarantee permanent radial pressure between the blade roots and the flanks of the slots. Finally, adding an additional part complicates the operations of assembling the rotor wheel and does not provide any solution to the problem of hot air recirculating between the platforms and the teeth of the disk.

In order to limit fretting phenomena between the blade roots and the disk, it is known to mount respective protection members on the blade roots. Interposing such a protection member that presents lower resistance to wear than do the blade root and the disk, makes it possible to preserve the blade root.

BRIEF SUMMARY OF THE INVENTION

A particular object of the invention is to provide a solution to the above-described problems of the prior art that is simple, inexpensive, and effective.

To this end, the invention provides a turbine wheel in a turbine engine, the wheel comprising a disk having a plurality of blades with roots that are axially engaged and radially retained in longitudinal slots in the outer periphery of the disk, the blades having platforms that extend circumferentially end to end and that are radially facing longitudinal teeth of the disk that define the slots, the wheel being characterized in that protection members for protecting the flanks of the slots and made out of sheet metal are mounted on the teeth of the disk and held thereon by co-operating shapes, the protection members including means for bearing radially against the platforms of the blades in order to oppose circumferential tilting of the blades, and they also include means for at least partially closing the radial gaps between the teeth and the platforms of the blades.

Unlike the prior art, the protection members of the invention are mounted on the teeth of the disk and no longer on the blade roots engaged in the slots.

These members for protecting the flanks of the slots perform two additional functions, namely limiting circumferential tilting of the blades and reducing gas recirculation between the platforms and the teeth of the disk, thus making it possible to avoid adding additional parts in the turbine.

It is also possible to incorporate dampers between the radially outer ends of two adjacent blades for the purpose of limiting vibration in operation, without running the risk of the dampers becoming separated.

According to a characteristic of the invention, the means for bearing radially against the blade platforms extend over the entire length of the protection members.

Compared with radial bearing means extending over part only of the length of the protection members, this configuration is advantageous since it provides better distribution of loading over the entire length of each platform and of each protection member during tilting of the blades in operation, thereby avoiding the appearance of high stress concentrations at local bearing points which would lead to those elements becoming deformed.

Advantageously, each protection member has a first portion engaged on a tooth of the disk and that carries a second portion extending radially between said tooth and a blade platform, the second portion including at least one radially outer face for bearing against said platform and at least one transverse face at its upstream end for closing the radial gap between the end of the tooth and the platform.

In a first embodiment of the invention, the second portion includes at least one element of U-shaped longitudinal section that is radially open towards the inside. In this configuration, the first of the side walls of the U-shaped element is arranged transversely and serves to limit the reintroduction of hot gas between a platform and the tooth of the disk on which the protection member is mounted. The junction wall between the side walls of the U-section element serves to bear radially against the inside face of the radially facing platform, thereby limiting the tilting movement of the blades.

According to another characteristic of the invention, the second portion has two elements of U-shaped section in longitudinal alignment along the tooth.

In a second embodiment of the invention, the second portion has two spaced-apart radial walls extending longitudinally over the first portion and connected together at their upstream ends by a transverse wall.

The radially outer ends of the radial walls serve to bear radially against the inside face of the platform, and the transverse wall limits the recirculation of hot gas between the platform and the tooth. This embodiment provides greater stiffness for the protection member since there is a better distribution over the entire length of the protection member of the loads that are withstood by the connection between the second portion that is for bearing against the platform and that consists of two radial walls extending longitudinally, and the first portion that is engaged on the tooth of the disk and that consists of a bearing surface for these walls.

The first and second portions of the protection member may be made as a single part by successive folding and stamping operations.

In a variant, the first and second portions of the protection member may be made of two distinct parts that are secured to each other by brazing or welding.

According to another characteristic of the invention, the first portion has a C-shaped cross-section.

In a variant embodiment of the invention, the first portion has two radial branches extending longitudinally and laterally defining a groove in which the second portion is engaged. The second portion may be engaged in the groove in sliding or tight manner.

Resilient means may be mounted with prestress in compression between the second portion of the protection member and the first portion.

In a preferred embodiment, the resilient means comprise sheet metal corrugated in the circumferential direction.

The corrugated sheet metal may include at least one notch into which the second portion of the protection member is engaged.

The invention is particularly advantageous when the blades are made of ceramic matrix composite material and include in particular vibration damper means. There is thus no longer any risk of the damper means becoming separated in operation because the anti-tilt means are incorporated in the protection members.

The invention also provides a turbine engine, such as an airplane turbojet or turboprop, characterized in that it includes a low-pressure turbine having at least one wheel of the type described above.

The invention also provides a member for protecting the flanks of a peripheral tooth of a turbine disk in a turbine engine, the member being characterized in that it comprises a portion having a C-shaped cross-section and carrying at least one transverse wall projecting radially at an axial end of the portion having a C-shaped section, together with outwardly-directed radial bearing means extending along the entire length of the member.

BRIEF DESCRIPTION OF THE SEVERAL VIEWS OF THE DRAWINGS

Other advantages and characteristics of the invention appear on reading the following description made by way of non-limiting example and with reference to the accompanying drawings, in which:

FIG. 4 is a diagrammatic view from upstream of the connection between roots of composite material blades and the disks of a prior art turbine wheel;

FIG. 5 is a diagram showing two adjacent blades and showing the circumferential tilting of the blades;

FIG. 6 is a diagrammatic view on section plane AA of FIG. 4;

DETAILED DESCRIPTION OF THE INVENTION

Figure 1:
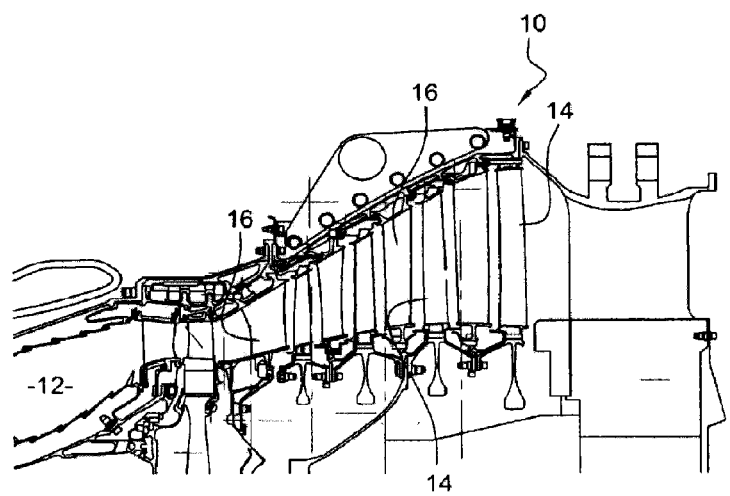
FIG. 1 is a fragmentary diagrammatic half-view in section of a turbine in a prior art turbine engine.

Reference is made initially to FIG. 1 showing a turbine 10 in a turbine engine arranged downstream from an annular combustion chamber 12. The turbine 10 has a plurality of wheels 14 arranged in alternation with annular rows of stationary vanes 16. The wheels 14 are driven in rotation by the stream of hot gas leaving the combustion chamber 12.

A wheel 14 comprises a disk 18 having a plurality of dove-tailed or analogous longitudinal slots 20 in its outer periphery in which blade roots 22 are engaged axially and held radially by co-operating shapes. For this purpose, the blade roots 22 are bulb-shaped, ensuring that they are held radially in the slots 20 of the disk 18. The slots are defined laterally by teeth 23.

Figure 2:
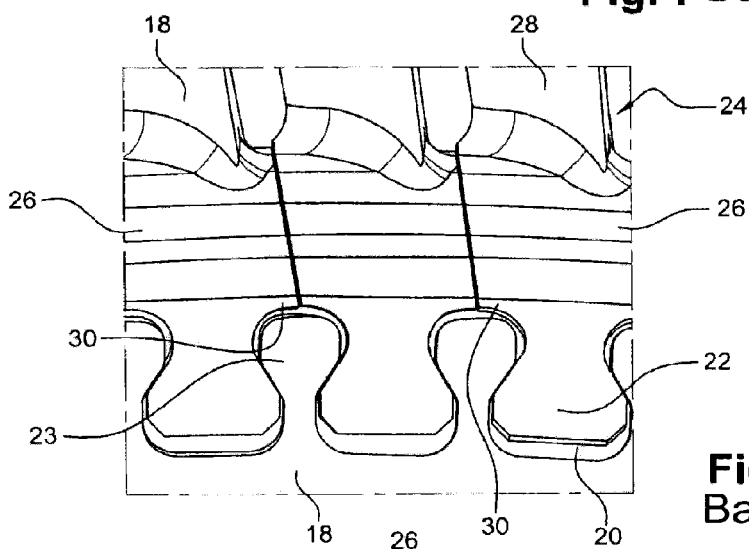
FIG. 2 is a diagrammatic view from upstream of the connection between the blade roots and the disks of a wheel of the FIG. 1 turbine.

A blade 24 thus has a root 22 connected externally to a platform 26 that extends circumferentially, and to an airfoil 28 that receives the hot gas stream and that extends radially from the platform 26. The platforms 26 extend circumferentially end to end so as to form an annular wall defining the inside of the annular passage for passing the flow of hot gas and serving to avoid hot gas being reinserted at the inner periphery of the disk 18 (FIG. 2).

Figure 3:
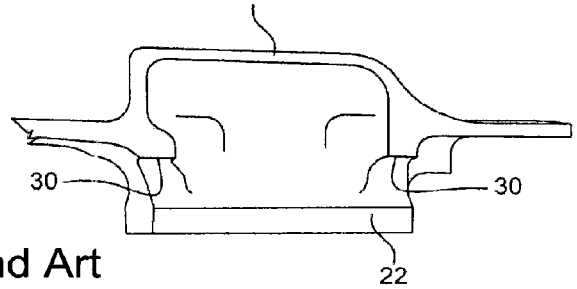
FIG. 3 is a diagrammatic side view of the radially inner portion of a prior art turbine blade.

At its upstream and downstream ends, each blade root 22 has a projecting portion 30 that extends circumferentially and that is arranged immediately above a tooth 23 of the disk 18 (FIG. 3). These projecting portions or rims 30 bear against the teeth 23 of the disk 18, thereby limiting the extent to which the blade roots 22 can tilt circumferentially in operation. These rims 30 also serve to limit the extent to which hot gas is reinserted between the platforms 26 and the teeth 23, thereby avoiding significant heating of the disk 18.

As explained above, when the blades 24 are made of composite material, such as a ceramic matrix composite, it is very difficult if not impossible to make the rims 30, since that would complicate and greatly lengthen the steps of fabricating blades 24 (FIG. 4).

Under such circumstances, and in the absence of rims 30 as shown in FIG. 4, the blades 32 can tilt circumferentially relative to one another as shown in FIG. 5 (arrows A and B), and that can lead to the loss, i.e. to the separation, of dampers 34 mounted between the radially outer ends or outer platforms 36 of adjacent blades, as explained above.

Furthermore, eliminating the rims 30 allows hot gas (arrow C) to recirculate from the hot gas passage into the gaps between the platforms 26 of the blades 32 and the teeth 23 of the disks 18, thereby greatly shortening the lifetime of the disk (FIG. 6).

The invention enables these problems to be solved together with those mentioned above by incorporating anti-tilting means and means for closing the radial gaps between the teeth and the blade platforms in a protection member for protecting the blade roots.

Figures 7, 8:
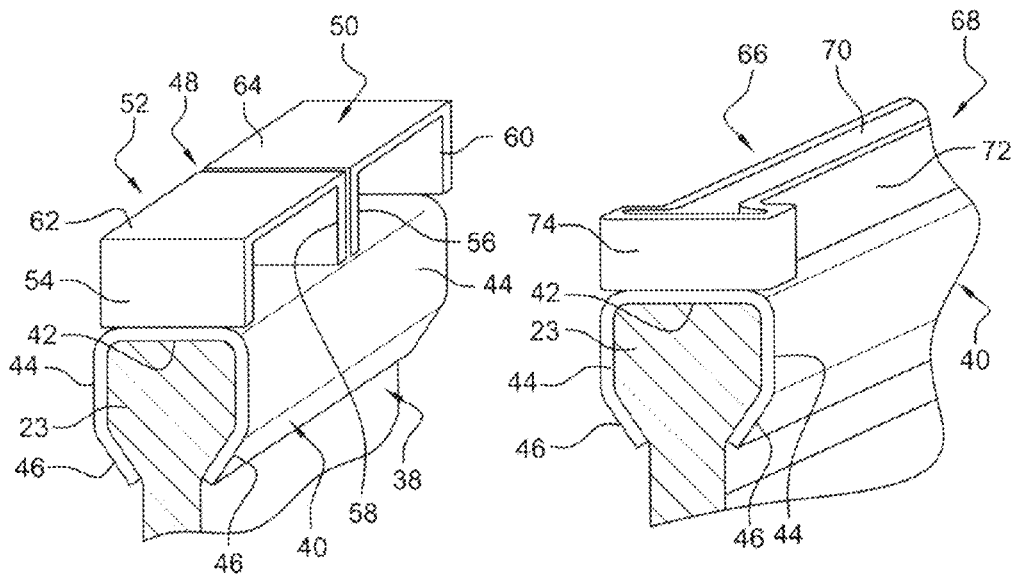
FIGS. 7 and 8 show two embodiments of a protection member of the invention.

FIG. 7 shows a protection member 38 of the invention having a first portion 40 of C-shaped cross-section for axially mounting and radially retaining the protection member 38 on a tooth 23 of the disk 18.

More precisely, this first portion 40 has a central wall 42 covering the outer face of the tooth 23 and two side walls formed by two radially extending and mutually parallel longitudinal walls 44. These walls 44 are connected at their radially inner ends to sloping walls 46 that extend radially inwards and towards each other. These sloping walls 46 serve to retain the protection member 38 radially on a tooth 23 of the disk 18 and they form bearing surfaces for the blade roots, thus preventing any contact and physico-chemical interaction between the composite material blade and the metal disk.

The central wall 42 and the radial walls 44 of the first portion provide the tooth 23 with thermal protection against the thermal radiation from the hot gas flowing outside the platforms 26.

The protection member 38 has a second portion 48 extending radially between a tooth 23 and a platform 26 facing it radially. This second portion 48 has means for bearing radially against the radially inner faces of the platforms of the blades and means for closing the radial gaps between the teeth and the platforms of the blades (FIGS. 7 and 8).

In a first embodiment of the invention, the second portion 48 comprises two elements 50 and 52 of U-shaped longitudinal section that are radially open towards the inside. The two elements 50 and 52 are longitudinally aligned along the tooth 23. In this embodiment, each element 50, 52 has respective upstream and downstream transverse walls 54 & 58 and 56 & 60. The upstream transverse wall 54 of the upstream element 52 is thus arranged radially between a tooth 23 and a radially facing platform 26 and it serves to close the end of the radial gap between the platform 26 and the tooth of the disk 18.

Each element 50, 52 also has a respective junction wall 62, 64 connecting together its transverse walls 54 & 58, 56 & 60. These junction walls 62, 64 thus serve as radial bearing surfaces for the inside face of the platform 26, thereby limiting tilting of the blade in operation.

In a variant of the FIG. 7 embodiment, the second portion could be constituted by a single element of U-shaped longitudinal section, this element extending over the entire length of the tooth 23.

In a second embodiment of the invention as shown in FIG. 8, the second portion 66 of the protection member 68 is constituted by two radial walls 70, 72 extending longitudinally on the first portion and connected together at their upstream ends by a transverse wall 74.

The radially outer ends of the radial walls 70, 72 form radial bearing faces for the radially facing platform 26, and the transverse wall 74 serves to close the radial gap between the platform 26 and the tooth 23.

The first and second portions 38 and 48, 66 may be made as a single part by successive folding and stamping operations, or they may be made as two distinct parts that are secured together by brazing or by welding.

The protection members 38, 68 may be made out of thin sheet metal having thickness of about 0.1 millimeter (mm), e.g. made of a nickel-based alloy such as Hastclloy HASTELLOY X or a cobalt-based alloy such as that known under the reference HS25.

Although the invention is particularly advantageous for blades made of composite material that do not enable rims to be incorporated therein as in the prior art, it is also applicable to blades made of metal.

Figures 9, 10:
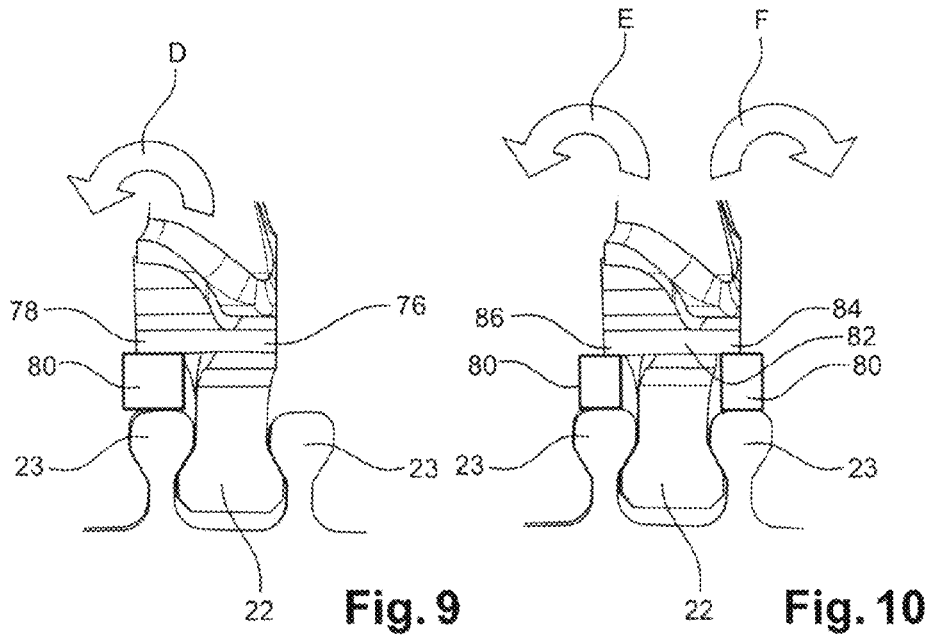
FIGS. 9 and 10 show the use of a protection member of the invention with two different blades.

FIG. 9 shows a blade root 22 that is substantially in alignment with an edge 78 of the platform 76. In this configuration, the platform 76 has only one edge 78 radially facing a tooth 23, and each protection member 80 serves to oppose tilting of the blades 32 in only one circumferential direction (arrow D).

FIG. 10 shows a blade 32 having its root 22 substantially centered on the platform 82. Each platform 82 has two side edges 84, 86 each arranged radially facing a respective tooth 23. In this configuration, each protection member 80 serves to prevent the blade 32 from tilting in both circumferential directions (arrows E and F).

Figures 11, 12:
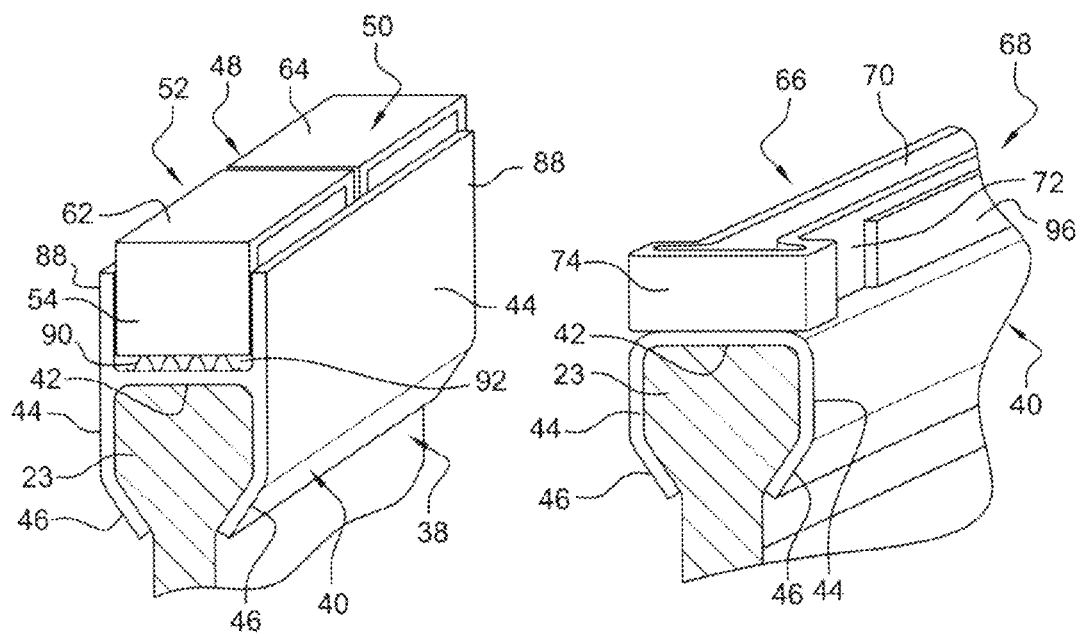
FIGS. 11 and 12 show two variant embodiments of the protection members shown in FIGS. 7 and 8.

In a variant of the FIG. 7 protection member, as shown in FIG. 11, the first portion 38 has two branches 88 extending the side walls 44 radially outwards at each circumferential end of the central wall 42. These branches 88 and the central wall 42 thus form a groove 92 in which the second portion 48, 66 is engaged. The branches 88 extend axially over the entire axial dimension of the second portion 48 that is itself made up of the U-section elements 50 and 52. In this embodiment, the first portion has an H-shaped section.

In a variant of the FIG. 8 protection member, as shown in FIG. 12, two longitudinal branches 96 extend radially outwards from the central wall 42 and co-operate therewith to form an axial groove. These two branches 96 extend axially over a fraction only of the second portion 66 made up of the walls 72 and 74.

The second portion 48, 66 may be mounted between the branches 88 and 96 in sliding or tight manner, depending on requirements. For example, a sliding fit enables the second portion to be positioned more easily on the first portion and in register with the outer platforms 76, 82, while a tight fit ensures that the second portion is held radially on the first portion when the engine is stopped.

Figure 13:
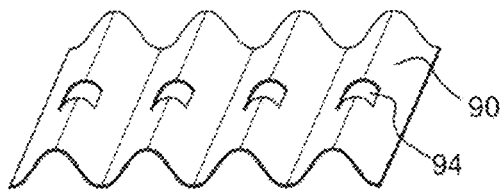
FIG. 13 is a view of a resilient member in the wheel of the invention.

As shown in FIGS. 11 and 13, resilient means may be mounted in the groove 92 between at least the inner ends of the transverse walls 54, 56, 58, 60 of the second portion 48 and the outer surface of the central wall 42. These means may be made of sheet metal 90 that is corrugated in the circumferential direction, e.g. including notches 94 formed in the outer portions of the corrugations and in circumferential alignment, the notches 94 serving to engage the inner ends of the transverse walls 54, 56, 58, 60 of the second portion. Clearance is left between the circumferential ends of the corrugated metal sheet 90 and the walls 88 so as to enable the resilient metal sheet 90 to be compressed and extended in the circumferential direction when the second portion 48 exerts a compression force thereon. This spring serves to press the second portion 48 against the platform 76, 82 so as to ensure that the junction walls 62, 64 are properly pressed thereagainst and so as to provide good insulation of the transverse walls 54, 56, 58, 60.

In the same manner, in the configuration shown in FIG. 12, resilient means may be mounted between the second portion 66 and the central wall 42.

The invention claimed is:

1. A turbine wheel in a turbine engine, the wheel comprising:
    a disk having a plurality of blades with roots that are axially engaged and radially retained in longitudinal slots in an outer periphery of the disk, the blades having platforms that extend circumferentially end to end and that are radially facing longitudinal teeth of the disk that define the slots,
    wherein protection members for protecting flanks of the slots and made out of sheet metal are mounted on the teeth of the disk and held radially outwards thereon by co-operating shapes, the protection members extending over an entire length of a respective tooth, and
    wherein each protection member includes
        a first portion engaged on the respective tooth of the disk, the first portion including a central wall covering an outer face of the respective tooth, first and second longitudinal walls extending radially inward from first and second lateral sides of the central wall, and first and second sloping walls extending from radially inner ends of the first and second longitudinal walls, respectively, the first and second sloping walls radially retaining the protection member on the respective tooth and presenting bearing surfaces for the blade roots, and
        a second portion disposed on an upper surface of the central wall and extending radially between the respective tooth and the blade platform, an entire bottom surface of the second portion abutting the upper surface of the central wall, the second portion including a radially outer face for bearing against the platform and a transverse face at an upstream end thereof for closing a radial gap between an end of the tooth and the platform.

2. A wheel according to claim 1, wherein the second portion includes at least one element of U-shaped longitudinal section that is radially open towards an inside of the wheel.

3. A wheel according to claim 2, wherein the second portion has two elements of U-shaped section in longitudinal alignment along the respective tooth.

4. A wheel according to claim 1, wherein the second portion has two spaced-apart radial walls extending longitudinally over the first portion and connected together at upstream ends thereof by a transverse wall.

5. A wheel according to claim 1, wherein the first and second portions of the protection member are made as a single part by successive folding and stamping operations.

6. A wheel according to claim 1, wherein the first and second portions of the protection member are two distinct parts that are secured to each other by brazing or by welding.

7. A wheel according to claim 1, wherein the first portion has a C-shaped cross-section.

8. A wheel according to claim 1, wherein the first and second longitudinal walls of the first portion laterally define a groove in which the second portion is engaged.

9. A wheel according to claim 1, wherein the blades are made of ceramic matrix composite material.

10. A turbine engine comprising a low-pressure turbine having at least one wheel according to claim 1.

11. A wheel according to claim 1, wherein an entire inner surface of the central wall, the first and second longitudinal walls, and the first and second sloping walls of the first portion abut the respective tooth.

12. A turbine wheel in a turbine engine, the wheel comprising:
    a disk having a plurality of blades with roots that are axially engaged and radially retained in longitudinal slots in an outer periphery of the disk, the blades having platforms that extend circumferentially end to end and that are radially facing longitudinal teeth of the disk that define the slots,
    wherein protection members for protecting flanks of the slots and made out of sheet metal are mounted on the teeth of the disk and held radially outwards thereon by co-operating shapes, the protection members extending over an entire length of a respective tooth, and
    wherein each protection member includes
        a first portion engaged on the respective tooth of the disk, the first portion including a central wall covering an outer face of the respective tooth, first and second longitudinal walls extending radially inward from first and second lateral sides of the central wall, and first and second sloping walls extending from radially inner ends of the first and second longitudinal walls, respectively, the first and second sloping walls radially retaining the protection member on the respective tooth and presenting bearing surfaces for the blade roots, and
        a second portion disposed on an upper surface of the central wall and extending radially between the respective tooth and the blade platform, the second portion including a radially outer face for bearing against the platform and a transverse face at an upstream end thereof for closing a radial gap between an end of the tooth and the platform,
    wherein the first and second longitudinal walls of the first portion laterally define a groove in which the second portion is engaged, and
    wherein resilient means for providing compression prestress are mounted between an entire bottom surface of the second portion of the protection member and the upper surface of the central wall of the first portion.

13. A wheel according to claim 12, wherein the resilient means comprise sheet metal corrugated in the circumferential direction.

14. A member for protecting flanks of a peripheral tooth of a turbine disk in a turbine engine, the member comprising:
a first portion having a C-shaped cross-section, the first portion including a central wall covering an outer face of the tooth, first and second longitudinal walls extending radially inward from first and second lateral sides of the central wall, and first and second sloping walls extending from radially inner ends of the first and second longitudinal walls, respectively, the first and second sloping walls radially retaining the protection member on the tooth; and
a second portion disposed on an upper surface of the central wall and extending radially, an entire bottom surface of the second portion abutting the upper surface of the central wall, the second portion including a radially outer face configured to bear against a blade platform and a transverse face at an upstream end configured to close a radial gap between an end of the tooth and the blade platform, the second portion extending along an entire length of the member and over an entire length of the tooth.

* * * * *